United States Patent [19]

Burkholder

[11] Patent Number: 4,818,171

[45] Date of Patent: Apr. 4, 1989

[54] PALLET TRANSFERRING ARRANGEMENT AND METHOD

[75] Inventor: Gary F. Burkholder, North Royalton, Ohio

[73] Assignee: Caterpillar Industrial Inc., Mentor, Ohio

[21] Appl. No.: 112,640

[22] Filed: Oct. 22, 1987

[51] Int. Cl.⁴ .......................... B65G 67/00; B60P 1/00
[52] U.S. Cl. .................................... 414/497; 414/352; 414/495; 414/401; 280/766.1
[58] Field of Search ............... 414/352, 353, 498, 349, 414/351, 495, 786, 280, 281, 282, 286, 401, 402, 584, 497, 522; 280/43.2, 766.1

[56] References Cited

U.S. PATENT DOCUMENTS

| | | | |
|---|---|---|---|
| 2,803,357 | 8/1957 | Ronfeldt | 214/82 |
| 2,925,929 | 2/1960 | Romine | 414/353 X |
| 3,486,653 | 12/1969 | Alstedt | 214/730 |
| 3,664,533 | 5/1972 | Hand | 214/516 |
| 3,857,501 | 12/1974 | Lasslg et al. | 214/41 |
| 4,456,418 | 6/1984 | Harter et al. | 414/351 |
| 4,496,274 | 1/1985 | Pipes | 414/340 |
| 4,538,950 | 9/1985 | Shiomi et al. | 414/222 |
| 4,565,480 | 1/1986 | Merk et al. | 414/225 |
| 4,597,709 | 7/1986 | Yonezawa | 414/401 |
| 4,718,810 | 1/1988 | Hoehn et al. | 414/286 |
| 4,741,412 | 5/1988 | Sable | 187/9 R |

FOREIGN PATENT DOCUMENTS

| | | |
|---|---|---|
| 0100867 | 2/1984 | European Pat. Off. |
| 2502302 | 7/1981 | Fed. Rep. of Germany |
| 3316050 | 11/1984 | Fed. Rep. of Germany |
| 8602952 | 6/1986 | Fed. Rep. of Germany |
| 2485497 | 12/1981 | France |
| 135354 | 10/1981 | Japan .................................. 414/495 |
| WO86/02057 | 4/1986 | PCT Int'l Appl. |

Primary Examiner—Leslie J. Paperner
Assistant Examiner—Gary Cundiff
Attorney, Agent, or Firm—Alan J. Hickman

[57] ABSTRACT

A pallet transferring arrangement and method for positioning a pallet transfer deck relative to a load transfer station is provided. The pallet transferring arrangement has a jack assembly for elevationally moving a load carrying member between first and second spaced positions relative to a vehicle frame. First and second guide assemblies guide the load carrying member and a supporting arrangement movably supports a pallet transfer deck on the load carrying member for movement in a plane. A plurality of replaceable deck positioning socket members engage a plurality of replaceable deck positioning cone members at the second position of the load carrying member and maintains the pallet transfer deck from movement in the plane. The plurality of deck positioning socket members are free from engagement with the deck positioning cone members at the first position of the load carrying members. A ground engaging foot is connected to and movable with the second guide assembly, and supports the load carrying member at a first position. Thus, pallet transfer deck positioning and stability are achieved in an efficient and economical manner. The pallet transferring arrangement is particularly suited for use on automatic guided vehicles.

29 Claims, 7 Drawing Sheets

FIG-4

Fig_5_

Fig_6_

PALLET TRANSFERRING ARRANGEMENT AND METHOD

DESCRIPTION

1. Technical Field

This invention relates to a pallet transfer arrangement and a method for transferring a pallet and more particularly to a material handling vehicle having an elevationally movable pallet transfer deck, a ground engaging foot and pallet transfer deck positioning socket and cone members, and a method for transferring a pallet between the pallet transfer deck and a pallet transfer station.

2. Background Art

Material handling vehicles, and particularly automatic guided vehicles of the driverless type (AGV), have been utilized for automatically transporting pallets, materials and the like between spaced apart transfer stations. Typically, these AGV's followed a floor mounted wire or stripe which limited its use to new or remodeled facilities. These AGV's required that the environment in which they operated had extremely smooth and level floors for reasons of accuracy in guidance, load transfer and load placement. With the advent of more sophisticated onboard guidance systems, for example, dead reckoning, inertial, and vision type guidance systems the need for floor supported guidance wires and stripes has been eliminated. As a result, todays AGV's may operate on existing floors and surfaces. This has increased the number and type of applications in which an AGV is suitable for use but not without creating additional problems.

One problem associated with uneven or rough floors relates to accuracy in vehicle docking and load transfer. In applications wherein the AGV is equipped with a pallet transfer deck it is necessary that the deck be accurately aligned with a load transfer station in order for load transfer to take place. Since the ground surface underlying the vehicle is uneven and varies relative to each load station it is evident that the floor cannot be relied on for as a locator for alignment between the vehicle and the load station. One attempted solution to this problem is shown in U.S. Pat. No. 4,538,950 to Tadataka Shiomi, dated Sept. 3, 1985 wherein four vehicle positioning cylinders having socket members are mounted vertically on the AGV and engage cone members mounted on the floor. The vehicle positioning cylinders elevate the vehicle so that the suspended wheels do not support the load to be transferred and thereby provide a stable and accurately located base for load transfer purposes.

The above solution, however, created several additional problems. At each transfer station there must be four cone members accurately mounted on the floor relative to the load station to which the palletized load must be transferred to and from. This is not only expensive to install but reduces the flexibility of the free ranging capabilities of the AGV. Because a plurality of vehicle positioning cylinders are used, the potential for wear, damage and relative changes in the extended length of the vehicle positioning cylinders is significant. Thus, to avoid inaccurate vehicle positioning of the AGV frequent adjustment and part replacement is required.

The U.S. Pat. No. 4,538,950 further discloses a plurality of vehicle mounted pallet lifting and positioning cylinders having a conically shaped end portion and a pallet having a plurality of positioning holes. The positioning cylinders engage the positioning holes and support the pallet in an elevated position above a plurality of vehicle mounted guide rollers and relative to the vehicle positioning cylinders during vehicle travel and lower the pallet onto the guide rollers when the vehicle is supported on the vehicle positioning cylinders and ready for load transferring. Since the pallet lifting and positioning cylinders are actuated for positioning the AGV before the pallet is lowered for transfer purposes, considerable additional time is required to perform the full alignment sequence. This reduces the efficiency of operation and results in reduced productivity.

In addition to the above, transfer of the pallet between transfer station and the AGV is accomplished by a pusher mechanism associated with each of the transfer stations. Since the vehicle is absent any mechanism for loading and unloading pallets, the AGV of the above identified patent is limited for use in applications having pusher mechanisms at each load transfer station.

The subject invention is directed to overcoming one or more of the problems as set forth above.

DISCLOSURE OF THE INVENTION

In one aspect of the present invention, a material handling vehicle having a frame, and first and second spaced apart sides, a load carrying member movable relative to the vehicle frame between first and second elevationally spaced apart positions, and first and second guide assemblies maintaining said load carrying member in a plane transverse to the vehicle sides, is provide. A ground engaging foot is connected to the second guide assembly and a jack assembly connected to the load carrying member simultaneously moves the load carrying member and the ground engaging foot between respective first and second elevationally spaced apart positions. Means is provided for movably supporting a pallet transfer deck on the load carrying member. A plurality of deck positioning cone members are connected to one of the vehicle frame and pallet transfer deck and a plurality of deck positioning socket members are connected to the other of the vehicle frame and pallet transfer deck. The plurality of deck positioning cone members are matingly restrainingly engaged with a respective deck positioning socket member at the second position of the load carrying member and spaced from mating restraining engagement with the deck positioning socket members at the first position of the load carrying member.

In another aspect of the present invention, a pallet transfer deck positioning arrangement for a material handling vehicle having a vehicle frame and a deck frame member elevationally moveable relative to the vehicle frame is provided. A first carrier having a deck positioning socket member receiving bore is connected to said transfer deck frame member and a first deck positioning socket member having a conically shaped bore is disposed in the deck positioning socket member receiving bore of the first carrier. A first means is provided for maintaining the first deck positioning socket member in the deck positioning socket member receiving bore.

The method of an embodiment of the present invention includes the steps of positioning a plurality of transfer socket members substantially in elevational alignment with a plurality of transfer cone members, actuating a jack assembly and moving the pallet transfer deck from a second elevational position toward a first elevational position, disengaging a plurality of deck positioning socket members from mating engagement with a plurality of deck positioning cone members and releasing the pallet transfer deck for movement, engaging the transfer socket members with the transfer cone members and supporting the pallet transfer deck on the transfer cone members, engaging a ground engaging foot with an underlying surface and supporting the pallet transfer deck on the underlying surface, and actuating a power means and moving a pallet along first and second guideways and onto the pallet transfer station.

BEST MODE FOR CARRYING OUT THE INVENTION

Figure 1:
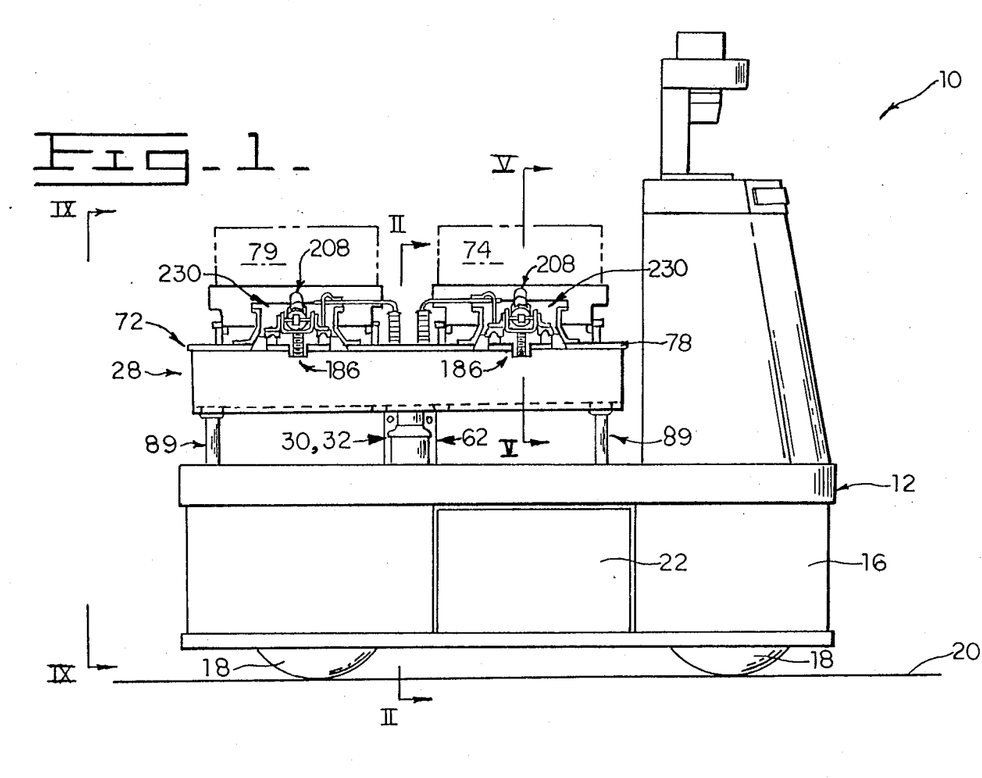
FIG. 1 is a diagrammatic side elevational view of an embodiment of the present invention showing an automatic guided vehicle with a pallet transfer deck mounted thereon.
Figure 2:
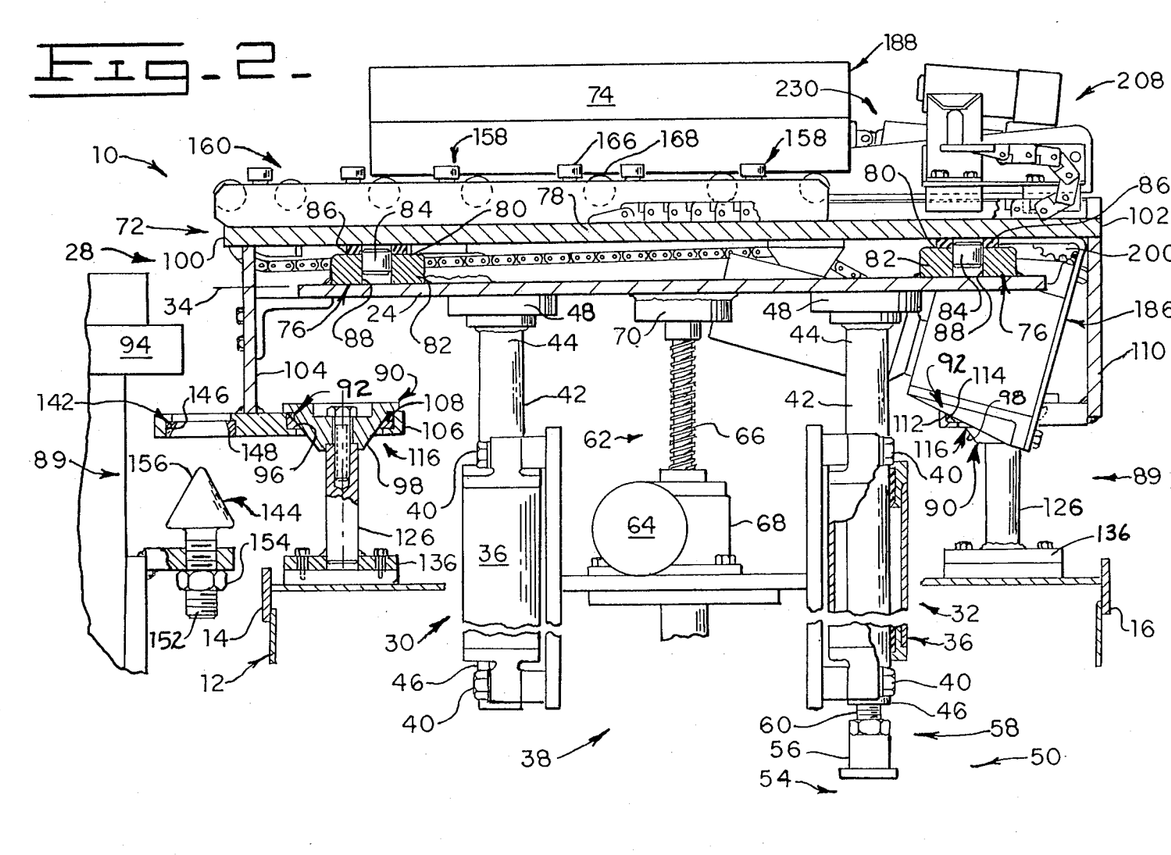
FIG. 2 is a diagrammatic cross sectional view, taken along lines II—II of FIG. 1, showing a portion of a pallet transfer station, the pallet transfer deck at a second position, a plurality of deck positioning socket and cone members engaged with each other, a ground engaging foot at a second position, and transfer socket and cone members spaced from engagement with each other.
Figure 3:
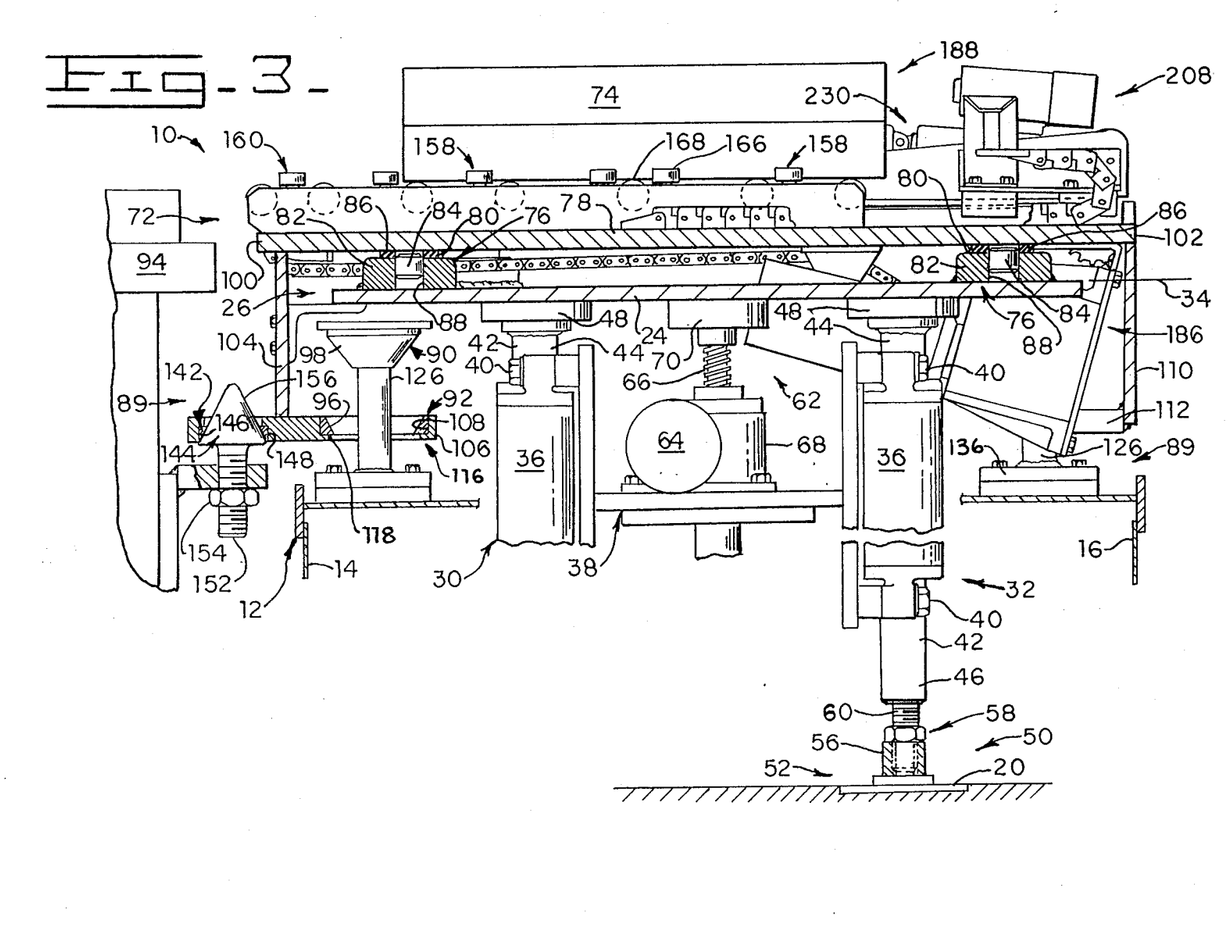
FIG. 3 is a diagrammatic cross sectional view, similar to that of FIG. 2, but, with the pallet transfer deck at a first position, the plurality of deck positioning socket and cone members spaced from engagement with each other, the ground engaging foot at a first position at which the foot is engaged with the ground, and the transfer socket and cone members in engagement with each other.
Figure 4:
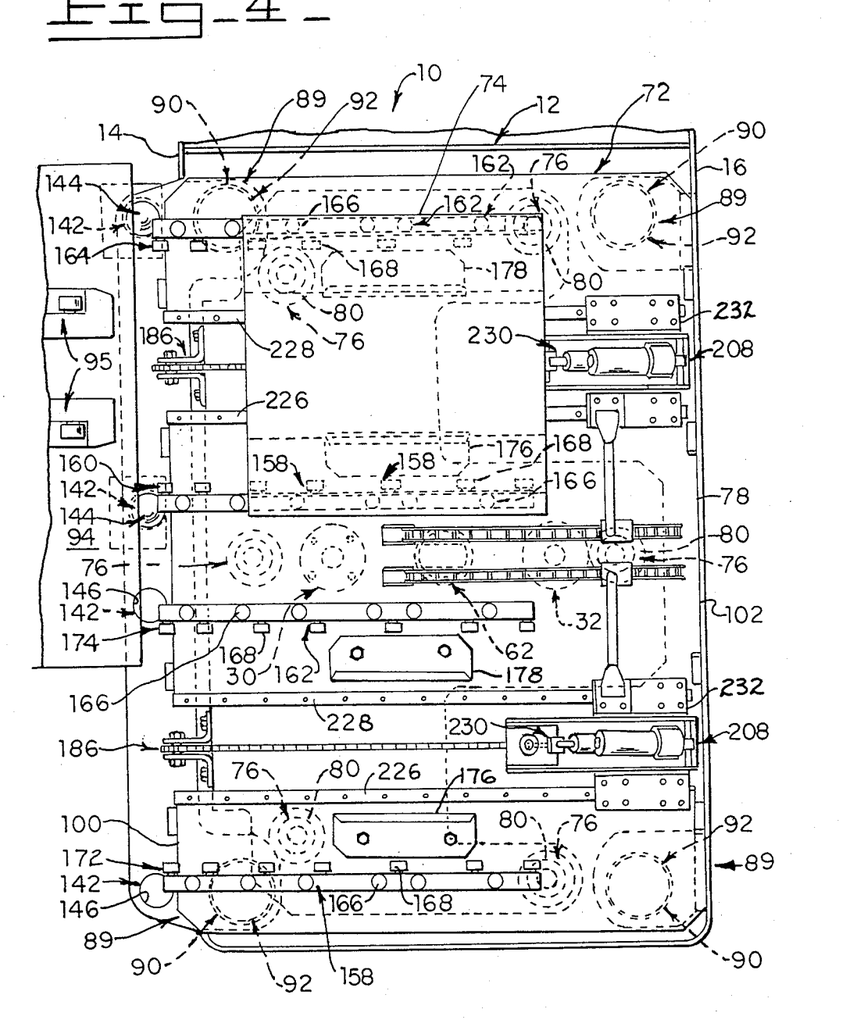
FIG. 4 is a diagrammatic top plan view of FIG. 1 showing the pallet transfer deck and a portion of the pallet transfer station in greater detail.

With reference to the drawings, and particularly FIGS. 1-3, a material handling vehicle 10 having a frame 12, first and second spaced apart sides 14,16 and a plurality of wheels 18 is provided. The wheels 18 are rotatably mounted on the frame 12 in any suitable manner and engage the underlying supporting surface 20. A source of motive power 22, for example an electric drive system, internal combustion engine, and the like, is provided for powering at least one of the wheels 18 and moving the material handling vehicle over the underlying surface 20. The material handling vehicle 10 as depicted in FIG. 1 is a driverless automatic guided vehicle which has free ranging capabilities and is guided by a laser guided system which delivers signals to an onboard computer. It should be noted that the invention hereinafter described, as suitable for use on a variety of material handling vehicles of both the automatic and operator controlled types. A load carrying member 26 is mounted on the vehicle frame 12 and movable between first and second elevationally spaced apart positions relative to the vehicle frame 12.

First and second substantially identical spaced apart guide assemblies 30,32 are mounted on the vehicle frame 12 and connected to the load carrying member 24. The first and second guide assemblies 30,32 guide the load carrying member for movement between the first and second elevationally spaced apart positions 26,28 and maintains the load carrying member in a plane transverse the first and second vehicle sides 14 and 16. The guide assemblies each have a housing 36 which is attached to the vehicle frame 12 by a bracket assembly 38 and threaded fasteners 40. The first and second guide assemblies 30,32 each have a guide rod 42 which is slidably disposed in the respective housings 36 and defines the directions of elevational movement of the load carrying member 24. Each of the guide rods 42 have first and second spaced apart end portions 44,46 and a flange 48 mounted on the first end portion of the guide rods. The flanges are connected to the load carrying member 24 as spaced apart locations thereon in any suitable manner, for example welding, threaded fasteners, and the like.

A grounding engaging foot 50 is connected to the second guide assembly and elevationally moveable between first and second spaced apart positions 52,54. Preferably, the ground engaging foot 50 is connected to the second end portion 46 of the guide rod 42 of the second guide assembly 32 and movable between the first and second elevationally spaced apart positions 52,54 in response to movement of the load carrying member 24 between the first position 26 (FIG. 3) of the load carrying member 24 and the second position 28 (FIG. 2) of the load carrying member 24. The ground engaging foot 50 is at its first position 52 when the load carrying member 24 is at its first position 26 and the ground engaging foot 50 is at the second position 54 when the load carrying member 24 is at its second position 28. The second guide assembly 32 is preferably spaced a greater distance from the first side 14 of the vehicle frame 12 than the first guide assembly 30 for the purpose of improving stability during unloading of the vehicle 10. This will become evident during subsequent discussions.

The ground engaging foot includes a ground engaging flange 56 and a means 58 for adjusting the distance between the second end portion 46 of the guide rod 42 of the second guide assembly 32 and the ground engaging flange 56. The adjusting means preferably includes a threaded shaft 60 which is connected to the rod second end portion in any suitable fashion such as welding or formed as a part thereof. The flange 56 is screwthreadably mounted on the threaded shaft. This enables the distance between the second end portion 46 of the rod 42 and the ground engaging flange to be varied as desired. A jack assembly 62 is mounted on the vehicle frame 12 at a location between the frame first and second sides 14 and 16 and the first and second guide assemblies 30 and 32. The jack assembly is connected to the load carrying member 24 and is extensible for simultaneously moving the load carrying member 24 and the ground engaging foot 50 between their respective first and second elevationally spaced apart positions 26,52,28,54. The jack assembly includes an electric motor 64 which is operatively connected to a worm gear 66 mounted in a gear housing 68. The worm gear 66 is connected to the load carrying member 24 such as by flange 70 which is welded to the load carrying member 24 and supported in any suitable manner on the worm gear 66. Rotation of the electric motor 64, and the direction of rotation thereof will cause the worm gear to extend and retract relative to housing 68 which will result in elevation movement of the load carrying member between the first position 26 (FIG. 3) and second position 28 (FIG. 2).

A pallet transfer deck 72 is provided for supporting a pallet 74 on the load carrying member 24. Means 76 movably supports the pallet transfer deck on the load carrying member. The supporting means 76 is disposed between the load carrying member 24 and a deck frame member 78 of the pallet transfer deck 72. The supporting means permits the pallet transfer deck to freely move in directions transverse the vehicle sides 14 and 16 and parallel to the plane 34 so that the pallet transfer deck may be positioned for unloading of the pallet 74. The supporting means 76 includes a plurality of bearing assemblies 80 connected at spaced apart locations to one of the load carrying member 24 and deck frame members 78 of the pallet transfer deck between the load carrying member 24 and the deck frame member 78. The bearing assemblies each have a pad 82 connected to the load carrying member 24, a projection 84 connected to and extending in an elevational direction from the pad 82 and a bushing having an aperture and being supported on and between the pad 82 and the deck frame member 78. The projection is disposed in the aperture 80 and maintains the bushing 86 on the pad 82. The bushing is preferably constructed of an acetal plastic material.

A pallet transfer deck positioning arrangement 89 has a plurality of deck positioning cone and socket members 90,92. The deck positioning cone members are connected to one of the vehicle frame 12 and pallet transfer deck 72 and the deck positioning socket members 92 are connected to the other of the vehicle frame 12 and pallet transfer deck 72. The deck positioning cone members 90 are each matingly restrainingly engaged with a respective deck positioning socket member 92 at the second position 28 of the load carrying member and spaced from mating restraining engagement with the deck positioning socket members 92 at the first position 26 of the load carrying member 24. The purpose of this is to prevent the pallet's transfer deck from moving on the supporting means 76 and relative to the load carrying member 24 during travel of the vehicle and to allow the pallet transfer deck 72 to freely move on the supporting means 76 and relative to the load carrying member 24 during positioning of the pallet transfer deck 72 relative to a pallet transfer station 94.

The plurality of deck positioning cone members 90 are preferably connected to the vehicle frame 12 and the plurality of deck positioning socket members 92 are preferably connected to the pallet transfer deck. The deck positioning socket members 92 each have a conically shaped bore 96 disposed therethrough and the deck positioning cone members 90 each have a conically shaped outer surface 98. The conically shaped bore 96 of each of the deck positioning socket members 92 and the conically shaped outer surface 98 of each of the deck positioning cone members 90 are oriented so that the diameters thereof increase in magnitude in a direction transverse an elevationally upward direction toward the plane 34. The pallet transfer deck has first and second spaced apart sides 100,102 which are positioned adjacent the first and second spaced apart vehicle sides 14,16 respectively. A first flange 104 is connected to the pallet transfer deck at 72 at a location on the pallet transfer deck 72 adjacent the first side 100. A first carrier member 106 having a deck positioning socket member receiving bore 108 is connected to the first flange 104 and one of the deck positioning socket members 92 is disposed in the receiving bore 108 of the first carrier member 106.

Figure 8:
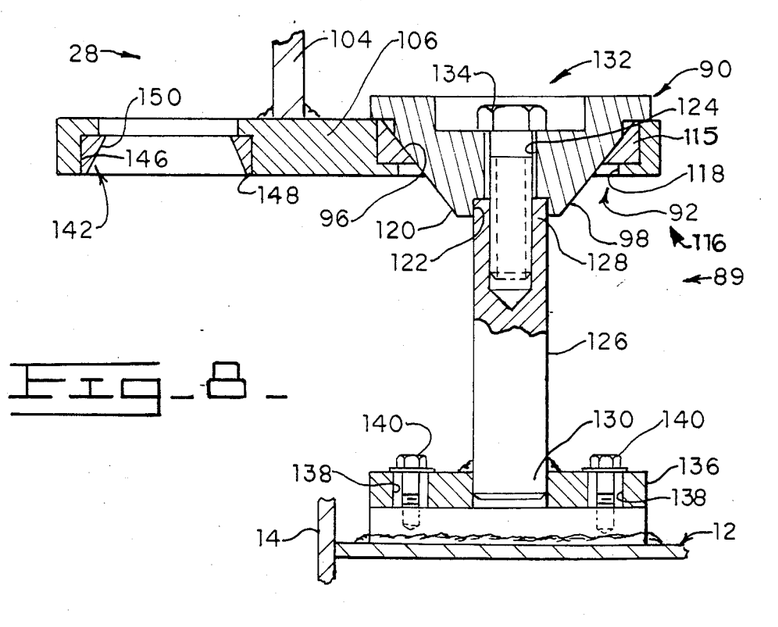
FIG. 8 is a diagrammatic enlarged detail of the deck positioning cone and socket members and the transfer socket member of FIG. 2.
Figure 9:
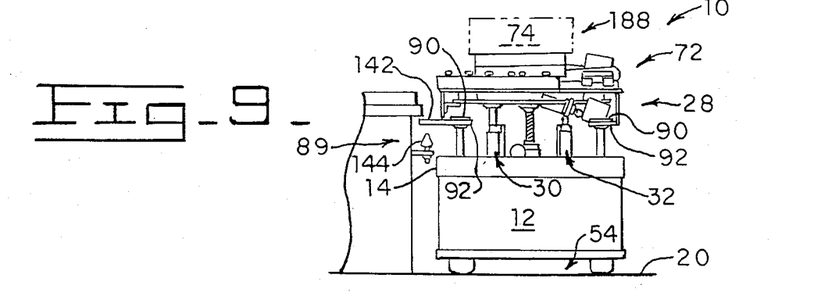
FIG. 9 is a diagrammatic view, taken along lines IX—IX of FIG. 1 showing the vehicle adjacent the load transfer station, a pallet transfer deck at the second position, the transfer socket members elevationally spaced above the transfer cone members, a pallet carried on the pallet transfer deck, and the ground engaging foot at the second position.
Figure 10:
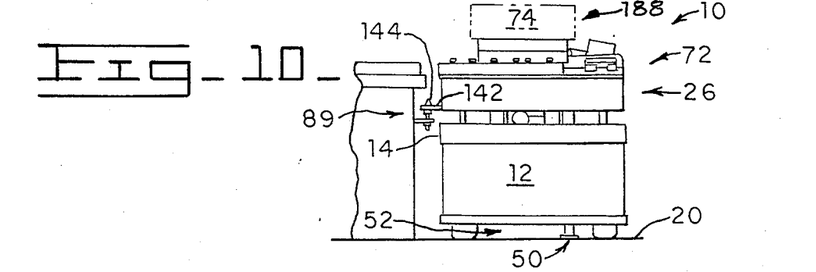
FIG. 10 is a diagrammatic view similar to that of FIG. 9 but with the pallet transfer deck in the first position, the transfer socket members engaged with the transfer cone members, and the ground engaging foot at the first position.
Figure 11:
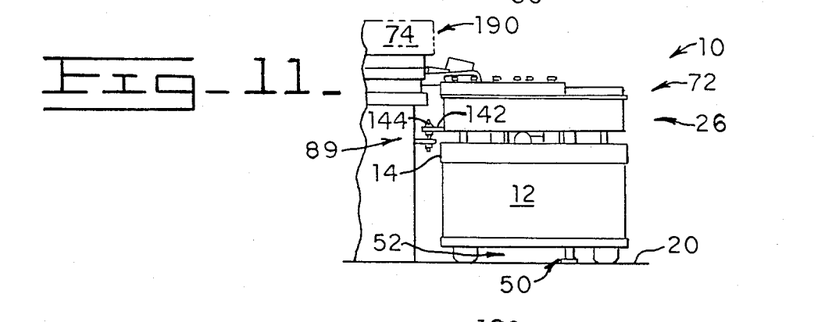
FIG. 11 is a diagrammatic view similar to that of FIG. 10 but with the pallet transfer deck in the first position, and the pallet transferred to and carried on the load transfer station.
Figure 12:
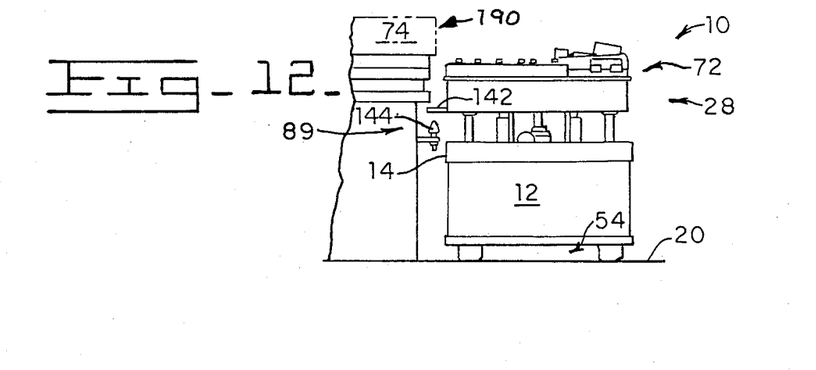
FIG. 12 is a diagrammatic view similar to that of FIG. 11 but with the pallet transfer deck at the second position, the transfer socket members spaced elevationally above the transfer cone members, and the ground engaging foot at the second position.

A second flange 110 is connected to the pallet transfer deck 112 at a location on the pallet transfer deck adjacent the second side 102 and spaced from the first flange 104. A second carrier member 112 which has a socket member receiving bore 114 is connected to the second flange 110. Another of the deck positioning socket members 92 is disposed in the deck positioning socket member receiving bore 114 of the second carrier member 112. The deck positioning socket members 92 preferably include annular rings 115 (FIG. 8). It is to be noted that the first carrier member 106 has a plurality of bores 108 for receiving the socket members 92, and the second carrier member 112 has a plurality of bores 114 for receiving the socket members 92.

Since the construction of each of the deck positioning socket members 92, deck positioning cone members 90, and the first and second carrier members 106,112 of the pallet transfer deck positioning arrangement 89 are substantially identical, only one arrangement will be discussed in detail. However, all discussion related to one will relate to the others, unless otherwise indicated. Referring to FIG. 8, a means 116 is provided for maintaining the deck positioning socket member 92 in the deck positioning socket member receiving bore 108. The means 116 preferably includes an annular stop flange 118 connected to the first carrier member 106 and extending radially inwardly from the deck positioning socket member receiving bore 108. The deck positioning socket member annular ring 115 is press fitted in the receiving bore 108 and in abutment with the annular stop flange 118. This permits ease of removal of the socket member 92 for replacement purposes when wear of the annular ring 115 is greater than allowable tolerances. It is to be mentioned that the means 116 includes alternative ways for maintaining socket member in the bore, such as by snap rings, set screws and the like without departing from the spirit of the invention.

Each deck positioning cone member 90 has an end portion 120, a counter bore 122 opening at the end portion 120, and a bore 124 passing through the cone member 90 and opening into the counterbore 122. A shaft 126 having a first and second end portions 128,130 is connected at the first end portion to the cone member 90 and at the second end portion 130 to the vehicle frame 12. Specifically, the shaft first end portion 128 is disposed in the counterbore 122 and means 132 connects the shaft first end portion 128 to the shaft 126. Means 132, for example, may include a threaded fastener 134 disposed in the bore of the cone member 90 and screwthreadably connected to the shaft 126. The shaft 126 is disposed in the conically shaped bore 96 of the respective deck positioning socket member 92.

A mounting flange 136 having a plurality of apertures 138 disposed therethrough is connected to the second end portion 130 of the shaft 126. A plurality of threaded fasteners 140 are positioned in the apertures 138 and screwthreadably connected to the frame 12. The apertures 138 are of a preselected size adequate to permit slidable adjusting movement of the mounting flange 134 in directions transverse the orientation of the shaft 126 and relative to the fasteners 140 to permit axial alignment of the deck positioning cone member 90 with the deck positioning socket member 92.

As best seen in FIGS. 2 and 3, the pallet transfer deck positioning arrangement 89 includes a plurality of spaced apart transfer socket members 142 connected to the pallet transfer deck 72 and a plurality of spaced apart transfer cone members 144 connected to the pallet transfer station 94. The transfer cone members 144 are engageable with the socket members 142 at the first position 6 (FIG. 3) of the load carrying member 24 and elevationally spaced from and free from engagement with the transfer socket members 142 at the second position 28 of the load carrying member 24. The first carrier member 106 has a plurality of spaced apart transfer socket member receiving bores 146 disposed therein. The receiving bores 146 are spaced from the receiving bores 108. The transfer socket members 142 each preferably include an annular ring 148 having a conical bore 150. The annular rings 148 are disposed in the transfer socket member receiving bores 146 and removably secured thereto in a manner identical to that of the annular rings of the deck positioning socket members 92.

The transfer cone members 144 each have a threaded shaft 152 which is screwthreadably connected to the pallet transfer station 94. A lock nut 154 threaded on the shaft 152 prevents inadvertent loosening and movement of the transfer cone members 144. The transfer cone members 144 each have a conically shaped outer surface 156 which matingly engages the conical bore 150 of the transfer socket members 142. The conical bore 150 of the transfer socket members 142 and the conical surface 156 of the transfer cone members 144 increase in diameter in a downward direction relative to the plane 34 and transverse to their longitudinal axes.

As best seen in FIGS. 2, 4, 5 and 6, the pallet transfer deck 72 has a plurality of spaced apart first pairs of aligned pallet guide roller sets 158 which are rotatably connected to the deck frame member 78. The first pairs of guide roller sets 158 define a first guideway 160 which extends in directions transverse the vehicle frame sides 14,16. A plurality of spaced apart second pairs of aligned pallet guide roller sets 162 are rotatably connected to the deck frame member 78 at locations thereon spaced from the first pairs of guide roller sets 158. The second pairs of guide roller sets 162 define a second guideway 164 which is substantially parallel to the to the first guideway 160 and extend in directions transverse the first and second vehicle frame sides 14,16. The first and second pairs of guide roller sets 158,162 support the pallet 74 thereon and rollingly guide the pallet 74 for substantially free movement in directions transverse the vehicle frame sides 14,16. Each pair of guide rollers has one guide roller 166 which is oriented normally to the other guide roller 168 to restrict movement in directions other than along the first and second guideways 160,164. It is to be noted that third and fourth parallel spaced apart guideways 172,174, which are identical in construction and orientation to the first and second guideways 160, 164, are provided on the deck frame member 78 to guide a second pallet 79.

Figure 6:
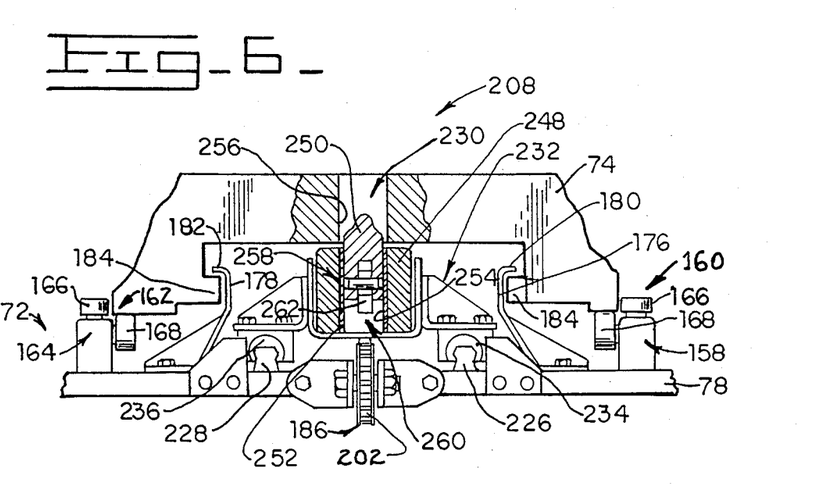
FIG. 6 is a diagrammatic view, taken along lines VI—VI of FIG. 5, with portions broken away, showing in greater detail the pallet transfer deck, the latch means, first and second guide rails and guideways, and first and second retaining brackets.

As best seen in FIGS. 1 and 6, first and second pallet retaining brackets 176,178, having a respective pallet hooking flange 180,182, are mounted on the deck frame member 78 at spaced apart locations between the first and second guideways 160,164 in any suitable manner, such as by bolts. The pallet hooking flange 180 extends in a direction toward the first guideway 160 and the pallet hooking flange 182 extends in a direction toward the second guideway 164. The first and second pallet hooking flanges 180,182 extend above lips 184 and prevent excessive elevational movement of the pallet 74 relative to the first and second guideways 160,164 and maintains the pallet on the first and second pairs of guide roller sets 158,162. It is to be noted that first and second pallet retaining brackets 176,178 are positioned between the third and fourth guideways 172,174 and retain the second pallet 79 on the third and fourth guideways 172,174 in an equivalent manner.

Figure 5:
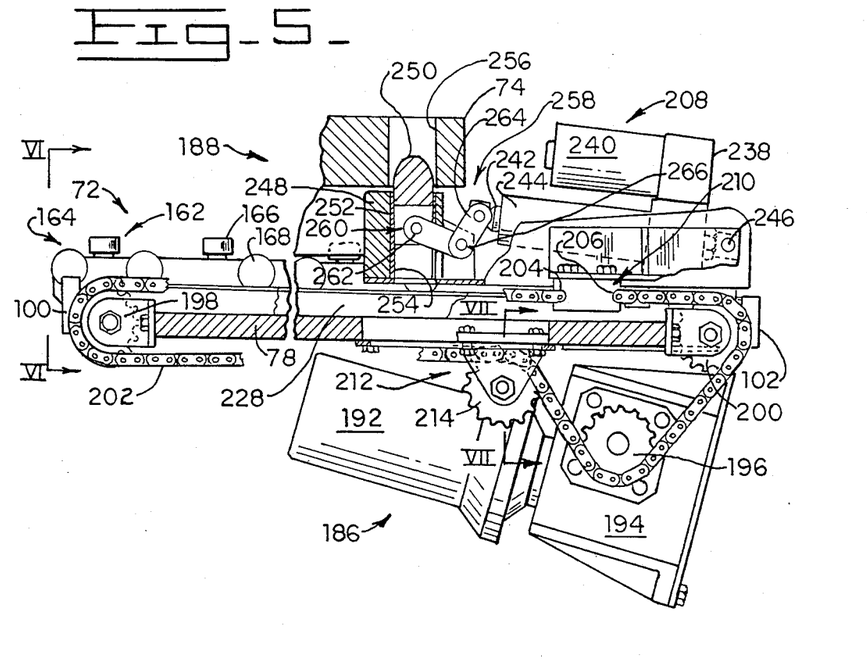
FIG. 5 is a diagrammatic cross sectional view, taken along lines V—V of FIG. 1, with portions broken away for clarity, showing in detail the construction of a power means for moving a pallet and a latch means for connecting the power means to the pallet.

As best seen in FIGS. 5 and 6, a power means 186 is provided for moving the pallet 74 along the first and second guideways 160,164 between a first position 188 at which the pallet 74 is fully supported and carried on the first and second guideways 160,164 and a second position 190 past the vehicle first side 14 at which the pallet 74 is free from being carried on the pallet transfer deck 72 and carried on the pallet transfer station 94. The power means 186 includes a motor 192, for example an electric motor, which is operatively connected to a transmission 194 of any well known speed reducing type having a drive sprocket 196 rotatably connected thereto. The drive sprocket 196 rotates in response to rotation of the motor and the transmission reduces the speed of the drive sprocket to a preselected value.

First and second spaced apart idler sprockets 198,200 are rotatably connected to the deck frame member 79 adjacent the first and second sides 100,102, respectively, of the pallet transfer deck 72. The idler sprockets 198,200 and drive sprocket are aligned and oriented so that a flexible drive member 202, for example a link chain, trained thereover extends in directions transverse the first and second sides 100,102. The flexible drive member 202 has opposite ends 204,206 which are connected to a latch means 208 by a bracket and pin arrangement 210.

Figure 7:
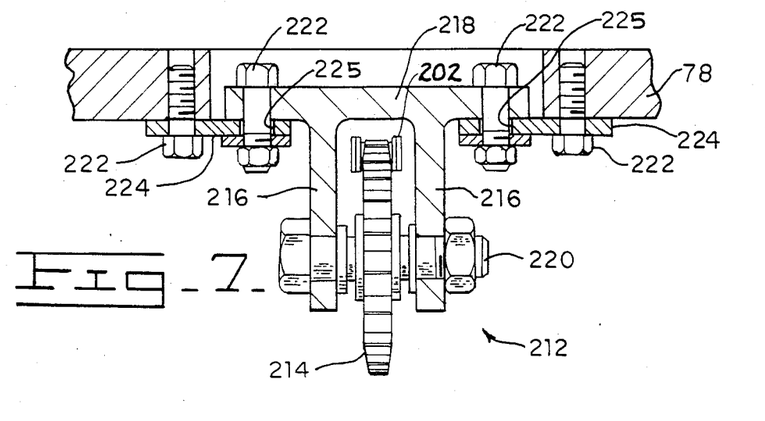
FIG. 7 is a diagrammatic cross sectional view, taken along lines VII—VII of FIG. 5, showing in detail a means for adjusting the tension in a flexible drive member of the power means.

Referring to FIGS. 5 and 7, a means 212 is provided for adjusting the tension in the flexible drive member 202. The tensioning means 212 includes a third idler sprocket 214 rotatably mounted between the bifurcations 216 of a sprocket mounting bracket 218 by a shaft assembly 220. The sprocket mounting bracket 218 is attached to the deck frame member 78 by a plurality of fasteners 222 and an adjustment plate 224. The adjustment plate 224 has a plurality of elongate holes 225 disposed therein which permit sliding movement of the sprocket mounting bracket 218 in directions transverse the vehicle frame sides 14,16. When the desired tension in the flexible drive member 202 is achieved the fasteners 222 disposed in the elongate holes are tightened which clamps the bracket to the adjustment plate 224 mounted on the deck frame member 78 by fasteners 222.

Referring particularly to FIGS. 5 and 6, the latch means 208 for releasably connecting the power means 186 to the pallet 74 includes first and second spaced apart substantially parallel guide rails 226,228 which are mounted on the deck frame member 78 between the first and second guideways 160,164 and extend in a direction substantially parallel to the first and second guideways 160,164 and transverse the vehicle frame sides 14,16. A pallet latching mechanism 230 has a carriage 232 which is mounted on the first and second guide rails 226,228 and movable along the guide rails between the first and second pallet transfer deck sides 100,102. The carriage 232 has first and second spaced apart guide bearings 234,236 which engage the first and second guide rails 226,228, respectively and support the carriage on the guide rails 226,228 for substantially low friction movement therealong. The pallet latching mechanism 230 includes an actuator 238 of the linear variety. The actuator 238 has an electric motor 240 which is drivingly coupled to an output shaft 242 which is extensibly movable relative to an actuator housing 244. The actuator housing 244 is pivotally connected to the carriage 232 by a pivot pin 246.

The pallet latching mechanism 230 also includes a latch pin guide 248 which is mounted on the carriage 232 and a latch pin 250 slidably disposed in the latch pin guide 248. The latch pin guide 248 has a sleeve bearing 252 and the latch pin 250 is slidably disposed in a bore 254 of the sleeve bearing 252. The latch pin 250 is movable in the latch pin guide 248 between a pallet releasing position, at which the latch pin 250 is retracted into the bore 254 and free from being disposed in a bore 256 of the pallet 74, and a pallet engaging position at which at least a portion of the latch pin 250 is disposed in the pallet bore 256.

Means 258 is provided for coupling the actuator 238 to the latch pin 250 and for moving the latch pin 250 between the pallet releasing and pallet engaging positions. The means 258 includes a bellcrank 260 which is pivotally pinned at opposite ends 262,264 to the latch pin 250 and the output shaft 242, respectively, and at a middle portion 266 to the latch pin guide 248. Extensible movement of the output shaft 242 results in pivotal movement of the bellcrank 260 about the middle portion 266 and extensible movement of the latch pin 250. Although the power and latch means 186,208 have been described with respect to the pallet 74 it should be recognized that an identical power and latch means is provided for moving the second pallet 79 along the third and fourth guideways 172,174.

Industrial Applicability

With reference to the drawings, and in operation, the material handling vehicle 10 is guided via the on board guidance system (not shown) toward a pallet transfer station 94 destination ar which the vehicle is to deposit a pallet 74. The pallet 74 is preferably of the German standard type (DIN pallet) which carries a fixtured work piece thereon for machining. The pallet transfer deck 72 is at the second position 28 during travel of the vehicle 10 so that the deck positioning cone members 90 are engaged with the deck positioning socket members 92 and the pallet transfer deck 72 is restrained from movement on the plane 34. The vehicle is maneuvered into position relative to the pallet transfer station 94 until the plurality of transfer socket members 142 are approximately in elevational alignment with the plurality of transfer cone members 144.

Once this alignment is achieved the jack assembly 62 is actuated and the load carrying member 24 is moved from the second position 28 toward the first position 26. As the deck is moved toward the first position 26 the deck positioning socket members 92 move away from mating engagement with the deck positioning cone members 90. This disengaging of the plurality of deck positioning socket members 92 from the deck positioning cone members 90 releases the pallet transfer deck 72 for free floating movement on the supporting means 76 and parallel to the plane 34. Movement of the load carrying member 24 is continued until the load carrying member 24 is at the first position 26. The plurality of transfer socket members 142 on the pallet transfer deck 72 move with the load carrying member 24 and into mating engagement with the transfer cone members 144 on the pallet transfer station 94. This engagement forces the pallet transfer deck 72 to align relative to the pallet transfer station 94 so that the first and second guideways 160,164 are aligned with the guideways 95 on the pallet transfer station 94 and the pallet transfer deck 72 is supported on the transfer cone members 144.

Simultaneously with and in response to movement of the load carrying member 24 from the second position 28 to the first position 26 the single ground engaging foot 50 is moved from its second position 54 to its first position 52 at which the ground engaging foot 50 is engaged with the underlying surface. The ground engaging foot 50 supports a major portion of the weight of the load carrying member 24 and pallet transfer deck 72 at the first position 52. It should be recognized that the transfer cone members 144 and the ground engaging foot 50 maintain the proper attitude of the pallet transfer deck 72 so that accurate transfer of the pallet 74 may be achieved. The transfer cones 144 and ground engaging foot 50 provide a three point support for the pallet transfer deck 72 at the first position 26 of the pallet transfer deck 72. It may be necessary in some applications to provide an isolated locator plate or the like on the ground for engagement by the ground engagement foot in order to maintain the pallet transfer deck level.

The power means 186 is then actuated and the latch means 208, which is engaged with the pallet 74, is moved along the first and second guide rails 226,228 toward the first side 100 and forcing the pallet 74 to move along the first and second guideways 160,164 from the first position 188, past the first side 100, and to the second position 190 on the pallet transfer station 94. The actuator 238 of the latch means 208 is then actuated to pivot the bellcrank 260 and withdraw the latch pin 250 from disposition in the pallet bore 256. This releases the latch means 208 from connection with the pallet 74. The power means 186 is then actuated and the latch means 208 is moved along the guide rails 226,228 toward the second side 102. When the latch means 208 is adjacent the second side 102 the power means 186 is stopped.

The jack assembly 62 is then actuated and elevationally moves the ground engaging foot 50 from the first position 52 toward the second position 54, the pallet transfer deck 72 from the first position 26 toward the second position 28, the transfer socket members 142 from mating engagement with the transfer cone members 144 and the deck positioning socket members 92 into mating engagement with the deck positioning cone members 90. The mating engagement of the deck positioning socket and cone members 92,90 will cause the pallet transfer deck to position relative to the vehicle frame 12 and maintain the pallet transfer deck 72 at the desired preselected position. The vehicle is now ready to acquire another pallet 74 and deliver the acquired pallet 74 to the same or another load transfer station 94.

To acquire a pallet 74 from the load transfer station the steps are similar to the ones described above but with the following exceptions. The latch means 208 is moved by the power means 186, without a pallet 74 connected thereto, into position beneath the pallet 74 to be acquired. The actuator 238 is actuated to move the latch pin 250 into engagement with and in the bore of pallet 74. The power means 186 is then actuated and the engaged pallet 74 is pulled by the power means 186 from the second pallet position 190, along the guideways 95 of the pallet transfer station 94, onto the first and second guideways 160,164 of the pallet transfer deck 72 and to the first pallet position. The pin 250 remains engaged in the pallet bore 256 and retains the pallet 72 from movement along the first and second guideways 160,164 and relative to the pallet transfer deck 72 during travel of the vehicle 10.

Subsequent to thousands of loading/unloading cycles the deck positioning cone and socket members 90,92 and the load transfer cone and socket members 142,144 may show some signs of wear. This wear, when acute enough will result in improper pallet transfer deck 72 positioning, an impossible situation to live with. Because the cone and socket members 90,92,142,144 are removably attached to the vehicle frame 12, pallet transfer deck 72 or pallet transfer station 94 removal and replacement thereof is a simple task.

Other aspects, objects and advantages of the present invention can be obtained from a study of the drawings, the disclosure and the appended claims.

I claim:

1. A material handling vehicle having a frame, and first and second spaced apart sides, a load carrying member movable relative to the vehicle frame between first and second elevationally spaced apart positions, and first and second guide assemblies maintaining said load carrying member in a plane transverse the vehicle sides, comprising;
    a ground engaging foot connected to the second guide assembly;
    a jack assembly connected to and simultaneously moving the load carrying member and said ground engaging foot between respective first and second elevationally spaced apart positions;
    a pallet transfer deck;
    means for movably supporting the pallet transfer deck on the load carrying member;
    a plurality of deck positioning cone members connected to one of the vehicle frame and pallet transfer deck; and
    a plurality of deck positioning socket members connected to the other of the vehicle frame and pallet transfer deck, said plurality of deck positioning cone members each being matingly restrainingly engaged with a respective deck positioning socket member at the second position of the load carrying member and spaced from mating restraining engagement with the deck positioning socket members at the first position of the load carrying member.

2. The material handling vehicle, as set forth in claim 1, wherein said first and second guide assemblies are spaced apart and the second guide assembly includes a rod slidably connected to the vehicle frame, said rod having first and second end portions and being connected at the first end portion to the load carrying member and at the second end portion to the ground engaging foot, said ground engaging foot including:
    a ground engaging flange; and
    means for adjusting the distance between the second end portion of the guide rod and the ground engaging flange.

3. The material handling vehicle, as set forth in claim 2, wherein said adjusting means includes a threaded shaft connected to the rod second end portion, said threaded shaft being screwthreadably connected to the ground engaging flange.

4. The material handling vehicle, as set forth in claim 1, wherein said plurality of deck positioning cone members are connected to said vehicle frame and said plurality of deck positioning socket members are connected to the pallet transfer deck, said deck positioning socket members having a conically shaped bore disposed therethrough and said deck positioning cone members having a conically shaped outer surface, said conically shaped bore of each of the deck positioning socket members and said conically shaped outer surface of each of the deck positioning cone members increasing in diameter in an elevationally upward direction toward said plane.

5. The material handling vehicle, as set forth in claim 4, wherein said pallet transfer deck has a first side, including:
    a first flange connected to the pallet transfer deck at a location on the pallet transfer deck adjacent the deck first side; and
    a first carrier member having a deck positioning socket member receiving bore and being connected to the first flange, one of said deck positioning socket members being disposed in the receiving bore of the first carrier member.

6. The material handling vehicle, as set forth in claim 5, wherein said pallet transfer deck has a second side spaced from said deck first side, including:
    a second flange connected to the pallet transfer deck at a location on the pallet transfer deck adjacent the deck second side and spaced from the first flange; and
    a second carrier member having a deck positioning socket member receiving bore and being connected to the second flange, another of said deck positioning socket members being disposed in the receiving bore of said second carrier member.

7. The material handling vehicle, as set forth in claim 6, wherein said deck positioning socket members each include an annular ring removably disposed in the deck positioning socket member receiving bore.

8. The material handling vehicle, as set forth in claim 4, including:
- a shaft having first and second end portions and being connected at the first end portion to at least one of said deck positioning cone members; and
- a mounting flange connected to said shaft second end portion, said mounting flange being connected to the vehicle frame.

9. The material handling vehicle, as set forth in claim 1, including:
- a plurality of spaced apart transfer socket members connected to the pallet transfer deck; and
- a plurality of spaced apart transfer cone members, said transfer cone members being engageable with the transfer socket members at the first position of the load carrying member and elevationally spaced from and free from engagement with the transfer socket members at the second position of the load carrying member.

10. The material handling vehicle, as set forth in claim 9, wherein said pallet transfer deck has a first side, including:
- a first flange connected to the pallet transfer deck at a location on the pallet transfer deck adjacent the deck first side, said first flange being adjacent the frame first side;
- a first carrier member having a plurality of spaced apart transfer socket member receiving bores disposed therein and being connected to the first flange, said transfer socket members each including an annular ring having a conically shaped bore disposed therein, said annular rings of the transfer socket members being disposed in the transfer socket member receiving bores of the first carrier member, said transfer cone members having a conically shaped outer surface, said conically shaped bore of each of the transfer socket members and said conically shaped outer surface of each of the transfer cone members increasing in diameter in an elevationally downward direction relative to said plane.

11. The material handling vehicle, as set forth in claim 10, wherein said plurality of deck positioning cone members are connected to said vehicle frame and said plurality of deck positioning socket members are connected to the pallet transfer deck, said deck positioning socket members having a conically shaped bore disposed therethrough and said deck positioning cone members having a conically shaped outer surface, said conically shaped bore of each of the deck positioning socket members and said conically shaped outer surface of each of the deck positioning cone members increasing in diameter in an elevationally upward direction toward said plane and, said first carrier member having a plurality of spaced apart deck positioning socket member receiving bores disposed therein and said deck positioning socket members being disposed in the deck positioning socket member receiving bores of the first carrier member.

12. The material handling vehicle, as set forth in claim 1, wherein said supporting means includes a plurality of bearing assemblies connected at spaced apart locations to one of the load carrying member and pallet transfer deck and between the load carrying member and pallet transfer deck.

13. The material handling vehicle, as set forth in claim 12, wherein each of said bearing assemblies include:
- a pad connected to one of the load carrying member and pallet transfer deck,
- a projection connected to sand extending in an elevational direction from said pad; and
- a bushing having an aperture and being supported on one of the pad and pallet transfer deck and between the pad and the pallet transfer deck, said projection being disposed in the aperture of said bushing and maintaining the bushing on said pad.

14. The material handling vehicle, as set forth in claim 13, wherein said bushing is constructed of a acetal plastic material.

15. The material handling vehicle, as set forth in claim 1, wherein said pallet transfer deck includes:
- a deck frame member;
- a plurality of spaced apart first pairs of aligned pallet guide roller sets connected to the deck frame member and defining a first guideway transverse the first vehicle side;
- a plurality of spaced apart second pairs of aligned pallet guided roller sets connected to the deck frame member and defining a second guideway transverse the first vehicle side, said first and second guideways being spaced apart and substantially parallel to each other.

16. The material handling vehicle, as set forth in claim 15, including:
- a first pallet retaining bracket having a first pallet hooking flange and being connected to said deck frame member at a location between the first and second guideways;
- a second pallet retaining bracket having a second pallet hooking flange and being connected to said deck frame member at a location between the first and second guideways, said first pallet hooking flange extending in a direction toward said first guideway and said second pallet hooking flange extending in a direction toward said second guideway.

17. The material handling vehicle, as set forth in claim 15, including
- a pallet carried on the first and second guideways;
- power means for moving said pallet along the first and second guideways; and
- a latch means for releasably connecting said power means to said pallet.

18. The material handling vehicle, as set forth in claim 17, wherein said power means includes:
- a motor mounted on said pallet transfer deck;
- a drive sprocket connected to said motor;
- first and second spaced apart idler sprockets rotatably connected to said pallet transfer deck;
- a flexible drive member having opposite ends and being connected at said opposite ends to said latch means, said flexible drive member being trained about said first and second idler sprockets and said drive sprocket;
- means for adjusting the tension in said flexible drive member.

19. The material handling vehicle, as set forth in claim 1, wherein said pallet transfer deck includes:
- a deck frame member;

first and second spaced apart guide rails mounted on said deck frame member and extending in a direction transverse the first vehicle side; and a pallet latching mechanism mounted on and movable along said first and second guide rails, said pallet latching mechanism having an actuator, a latch pin guide, and latch pin slidably disposed in the latch pin guide and extensibly movable in said latch pin guide between pallet releasing and pallet engaging positions;

means for coupling said actuator to said latch pin and moving said latch pin between said pallet releasing and engaging positions.

20. The material handling vehicle, as set forth in claim 19, wherein said pallet latching mechanism includes a carriage having first and second spaced apart guide bearings mounted on the first and second guide rails, respectively, and said coupling means includes a bellcrank pivotally connected to said latch pin guide, said actuator and said latch pin.

21. The material handling vehicle, as set forth in claim 19, wherein said pallet transfer deck includes;

first and second spaced apart guideways connected to the deck frame member and oriented in a direction transverse the vehicle frame, said first and second guideways being substantially parallel to the first and second guide rails, respectively; and power means for moving said latching mechanism along said first and second guide rails.

22. A method of transferring a pallet between a pallet transfer deck of an automatic guided vehicle and a pallet transfer station, including the steps of:

positioning a plurality of transfer socket members connected to one of the pallet transfer deck and station substantially in axial alignment with a plurality of transfer cone members connected to the other of the pallet transfer deck and station;

elevationally moving the pallet transfer deck from a second elevational position toward a first elevational position to disengage a plurality of deck positioning socket members connected to one of the pallet transfer deck and automatic guided vehicle from mating engagement with a plurality of deck positioning cone members connected to the other of the pallet transfer deck and automatic guided vehicle and releasing the pallet transfer deck for movement and to engage the transfer socket members with the transfer cone members while engaging a ground engaging foot with an underlying surface to support the pallet transfer deck on the transfer cone members and the underlying surface; and moving the pallet onto the pallet transfer station.

23. A method, as set forth in claim 22, including the steps of:

releasing a latch means from connection with said pallet; and moving said latch means along first and second guide rails and onto the pallet transfer deck.

24. A method, as set forth in claim 22, including the step of:

elevationally moving the pallet transfer deck from a first elevational position toward a second elevational position to disengage the plurality of transfer socket members from engagement with the transfer cone members and the ground engaging foot from engagement with the underlying surface and releasing the pallet transfer deck for movement, and to engage the plurality of deck positioning socket members with the plurality of deck positioning cone members and position and restrain the pallet transfer deck relative to the self guided vehicle and from movement.

25. A material handling vehicle having a frame, first and second apart sides, and a load carrying member movable relative to the vehicle frame between first and second elevationally spaced apart positions, comprising:

a ground engaging foot connected to the load carrying member;

means for moving the load carrying member and said ground engaging foot between respective first and second elevationally spaced apart positions;

a pallet transfer deck;

a first carrier having a deck positioning socket member receiving bore and being connected to one of the vehicle frame and pallet transfer deck;

means for movably supporting the pallet transfer deck on the load carrying member;

a deck positioning cone member connected to the other of the vehicle frame and pallet transfer deck; and a deck positioning socket member having a conically shaped bore and being disposed in the deck positioning socket member receiving bore of the first carrier;

means for maintaining said deck positioning socket member said deck positioning socket member receiving bore, said deck positioning cone member being matingly restrainingly engaged with the deck positioning socket member at one of the first and second positions of the load carrying member and spaced from mating restraining engagement with the deck positioning socket member at the other of the first and second positions of the load carrying member.

26. A material handling vehicle, as set forth in claim 25, where of said deck positioning socket members includes an annular ring and wherein said means for maintaining said deck positioning socket member in the deck positioning socket member receiving bore includes an annular stop flange connected to said first carrier member and extending radially inwardly from the deck positioning socket member receiving bore, said annular ring being press fitted in the deck positioning socket member receiving bore and in abutment with the annular stop flange.

27. A material handling vehicle, as set forth in claim 25, including:

a shaft having first and second spaced apart end portions and being connected at said second end portion to said vehicle frame, said shaft being disposed in the conically shaped bore of the deck positioning socket member;

a deck positioning cone member having a conically shaped outer surface and an end portion, said conically shaped outer surface being engageable with the conically shaped bore of the deck positioning socket member in response to elevational movement of the transfer deck frame; and means for connecting the end portion of the deck positioning cone member to the shaft first end portion.

28. A material handling vehicle, as set forth in claim 27, wherein end portion of said deck positioning cone member has a bore and a counterbore and said shaft first end portion being disposed in the counterbore, said means for connecting the deck positioning cone member to the shaft first end portion includes a threaded fastener disposed in the deck positioning cone member bore and screwthreadably connected to said shaft.

29. A material handling vehicle, as set forth in claim 28, including:
 a mounting flange having a plurality of apertures disposed therethrough and being connected to the shaft second end portion;
 a plurality of threaded fasteners disposed in said apertures and screw threadably connected to the vehicle frame, said mounting flange apertures being of a preselected magnitude sufficient to permit adjusting movement of the mounting flange in directions transverse the shaft.

* * * * *

UNITED STATES PATENT AND TRADEMARK OFFICE
CERTIFICATE OF CORRECTION

PATENT NO. : 4,818,171

DATED : April 4, 1989

INVENTOR(S) : Gary F. Burkholder

It is certified that error appears in the above-identified patent and that said Letters Patent is hereby corrected as shown below:

Claim 13, Column 14, Line 8, "sand" should be --and--.

Claim 25, Column 16, Line 29, insert --in-- before "said".

Claim 26, Column 16, Line 39, delete "where" and insert --wherein each--.

Signed and Sealed this

Thirty-first Day of October, 1989

Attest:

DONALD J. QUIGG

Attesting Officer

Commissioner of Patents and Trademarks